S. BRICKMAN.
OIL REFINING.
APPLICATION FILED SEPT. 3, 1917.
1,279,506.
Patented Sept. 24, 1918.
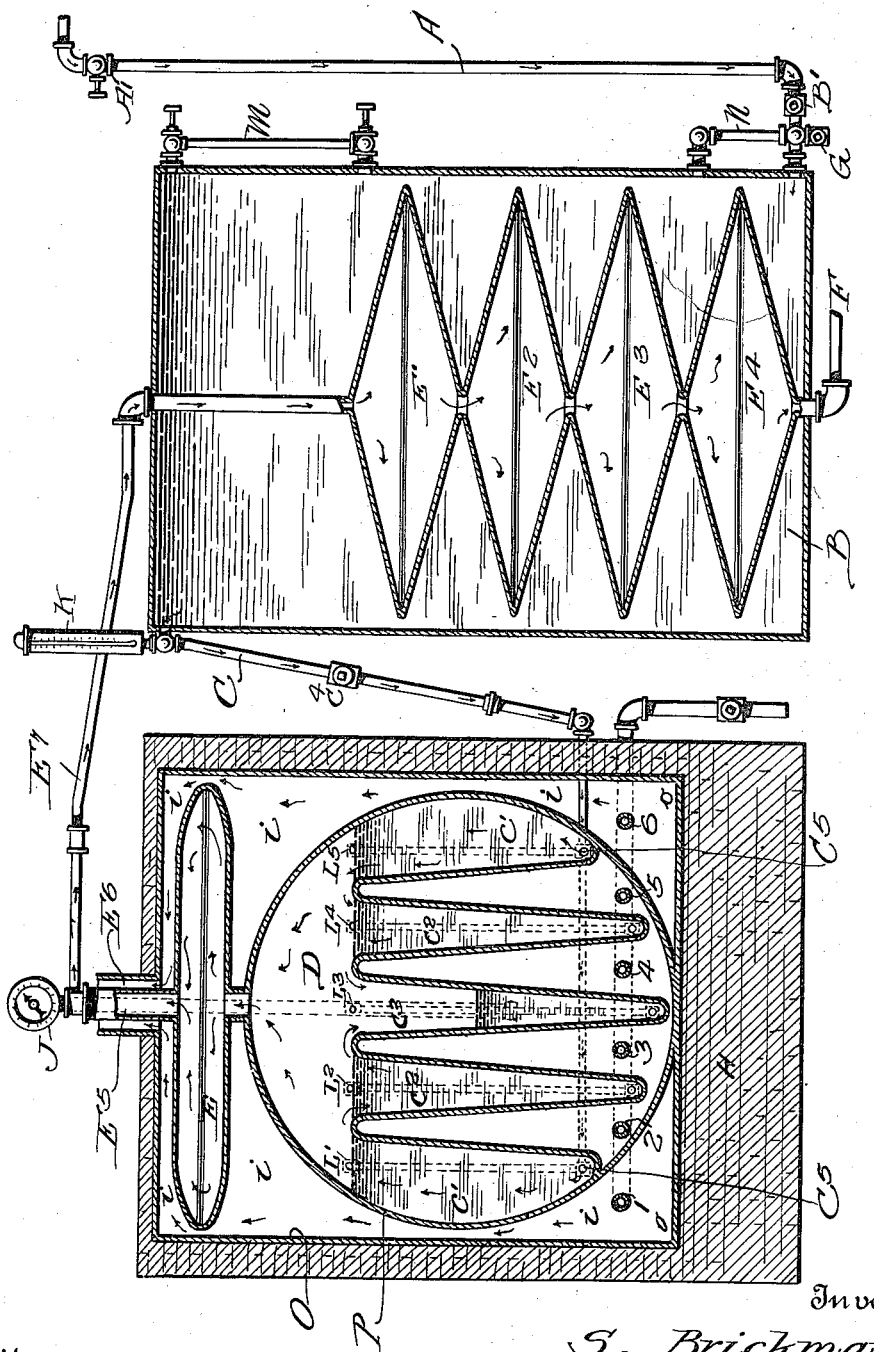
Witness
H. Woodard
Inventor
S. Brickman
By H. B. Willson & Co.
Attorneys

UNITED STATES PATENT OFFICE.

SAMUEL BRICKMAN, OF OKLAHOMA, OKLAHOMA.

OIL-REFINING.

1,279,506.  Specification of Letters Patent.  Patented Sept. 24, 1918.

Application filed September 3, 1917. Serial No. 189,426.

*To all whom it may concern:*

Be it known that I, SAMUEL BRICKMAN, a citizen of Russia, residing in the city of Oklahoma, county of Oklahoma, and State of Oklahoma, have invented a new and useful Improvement in Oil-Refining, of which the following is a specification.

The principal object of my invention is to provide an extremely simple apparatus for refining crude oil of all grades and obtaining a larger quantity of gasolene than is possible by the systems now in use, the improved apparatus being so constructed as to operate without the use of steam plants, water, chemicals, and coils of pipe for condensing purposes, whereby labor, material and time are greatly saved.

With the foregoing general object in view, the invention resides in the novel apparatus hereinafter fully described and claimed, the descriptive matter being supplemented by the accompanying drawing which forms a part of this specification and in which a vertical section of the apparatus is shown.

In the drawing above briefly described, B designates an oil containing tank having a supply pipe A equipped with a cut-off valve A' and with a suitable regulator B' for controlling the flow of oil into the tank. Also associated with the pipe A is a gage glass N by which the amount of sediment in the lower end of the tank may be ascertained, said gage glass having a suitable cleanout device G at its lower end, whereby any foreign matter may be removed from the tank after the valve A' is first closed. For ascertaining the level of oil in the tank B, said tank is preferably provided with a gage glass M adjacent its upper end.

Leading from the upper end of tank B is an oil outlet pipe having a suitable valve $C^4$, the lower end of said pipe extending horizontally across a fire proof housing H of brick or the like, while the upper end of said pipe is by preference equipped with a thermometer K for determining the temperature of the oil as the latter is discharged from tank B. The housing H is preferably though not necessarily lined with steel as indicated at O and located within said housing is a cylindrical casing P, also by preference formed of steel, although other suitable material could well be used. The casing P is spaced from the vertical sides and from the top of the housing and the upper side of said casing is provided with a vapor outlet which discharges into a substantially flat horizontally disposed vapor superheating chamber E. A vapor outlet $E^5$ rises from the condenser E through a hot air outlet $E^6$ formed in the top of the housing H and a pipe line $E^7$ leads from said outlet $E^5$, the end of said pipe line extending vertically into the top of the oil tank B as shown.

By the means yet to be described, vapors of relatively low and high gravity are distilled from crude oil in the casing P, these vapors being superheated in the chamber E and being discharged from the latter through the outlet $E^5$ and pipe line $E^7$ into the uppermost of a plurality of vertically spaced condensing cells $E^1$, $E^2$, $E^3$ and $E^4$, these cells being located in the oil tank B. The hot vapors discharged from the apparatus thus serve to heat the condensing cells more or less and at the same time the oil surrounding these cells serves to sufficiently cool the gas to condense it to a liquid. Condensing of the outgoing vapors and initial heating of the inflowing oil is thus accomplished by a single arrangement of parts, this being highly advantageous.

The several cells $E^1$, $E^2$, $E^3$ and $E^4$, are each provided with a substantially cone-shaped top and a substantially inverted cone-shaped bottom, the apices of adjacent tops and bottoms communicating through suitable openings as shown. By this arrangement, the entering vapor is caused to expand and then contract in each cell, so that the condensing efficiency of these cells is extremely high. The condensed liquid is drawn off through the pipe F and due to the novel construction of the vaporizing means yet to be described, this liquid will contain practically all of the combustible vapors naturally contained in crude oil. At least 50% more fuel is obtained by the present method than by known systems heretofore employed for the same purpose.

Located within the cylindrical casing P are inclined though substantially vertical partitions whose upper and lower edges are joined to form oil heating receptacles $C^1$, $C^2$ and $C^3$, $C^3$ being located at the center of the series, the two receptacles $C^1$ being positioned at the ends of said series and the receptacles $C^2$ being located between $C^1$ and $C^3$. At $C^5$ the pipe C discharges into the lower end of the receptacles $C^1$ and thus they are filled with crude oil from the tank B. When the receptacles $C^1$ are entirely full, the oil overflows into the receptacles C² and the same operation takes place when these receptacles are filled, the central receptacle or cracking chamber C³ then receiving the discharge. Gas burners 1, 2, 3, 4, 5 and 6 or other suitable heating means are employed for the several oil heating compartments, burners 1 and 6 being located on the exterior of the casing P, while the others are positioned within said casing and between the lower ends of the several receptacles. The waste heat from the burners circulates within the housing H throughout the spaces indicated by the character $i$, such heat thus serving to operate the superheater E before it escapes through the outlet E⁶.

Feeding of the crude oil first into the receptacles C¹ from the latter into receptacles C², and from these receptacles into the central cracking chamber C³, causes the oil within the several receptacles to give off vapors of different gravity, but all of these vapors are blended in the dome D within the upper portion of the casing P, these blended vapors then passing into the superheater E and traveling from the latter to the condensing cells in the manner above set forth.

Gage glasses L¹, L², L³, L⁴ and L⁵ are preferably provided for the several oil heating receptacles and a pyrometer J is used for determining the final temperature of the waste oil in the cracking chamber C³. This oil may be drawn off in any preferred manner as required.

From the foregoing, taken in connection with the accompanying drawing, it will be obvious that I have provided an extremely simple and inexpensive apparatus for the purpose intended and that such apparatus will operate to great advantage without the use of the heretofore necessary, cumbersome and expensive features such as steam plants, cold water supply means, chemicals, coils of pipe, etc. Since probably the best results are obtained from the details shown and described, these details may be followed, but within the scope of the invention as claimed numerous minor changes may well be made.

I claim:

1. An apparatus for distilling oil comprising a fire-proof housing, a plurality of inclined but substantially vertical partitions in the lower portion of said housing and joined together at their edges to provide a plurality of V-shaped oil heating receptacles, burners between said receptacles for heating them to cause the oil therein to give off vapors of different gravity, and a common outlet for all of the generated vapors.

2. An apparatus for distilling oil comprising a hollow fire-proof housing, a plurality of oil heating receptacles in said housing formed of inclined but substantially vertical partitions with their edges joined to each other, means for supplying oil to said receptacles, heating means for said receptacles, a vapor collecting and blending dome over and communicating with all of said receptacles, a substantially flat horizontally disposed super heater above said dome and heated by the waste heat from said heating means, the edges of said super heater being located adjacent the housing walls, an outlet for conducting the generated vapors from said dome into said superheater, and an outlet from the latter.

3. An apparatus for distilling oil comprising a fire-proof housing, a plurality of inclined but substantially vertical partitions in the lower portion of said housing and joined together at their edges to provide a plurality of V-shaped oil heating receptacles, burners between said receptacles for heating them to cause the oil therein to give off vapors of different gravity, a hot air outlet from the upper portion of said housing, a vapor collecting and blending dome in said housing over all of said receptacles, a flat horizontally disposed super-heater between said dome and the top of said housing with its edges located adjacent the walls of the latter, said super heater communicating with said dome and being heated by the waste heat from said burners, and a vapor outlet leading from said superheater through said hot air outlet of the housing.

4. An apparatus for distilling oil, comprising a hollow fire proof housing, a cylindrical casing in said housing spaced from the sides and top thereof, a plurality of inclined but substantially vertical partitions in said casing and joined at their upper and lower edges to form a plurality of oil receptacles, said receptacles being spaced downwardly from the top of the casing to provide a vapor blending dome, means for supplying oil to said receptacles, heating means for said receptacles between the same and the bottom of the casing, additional heating means on the exterior of said casing, a substantially flat horizontally disposed super-heater between the top of said casing and the top of said housing, an inlet from said dome into said superheater and an outlet from the latter.

In witness whereof, I have hereunto set my hand this 27th day of August, 1917.

SAMUEL BRICKMAN.

Witnesses:
J. E. SIMMONS,
JOHN B. WEIGAND.